(12) United States Patent
McWhirter et al.

(10) Patent No.: US 6,299,776 B1
(45) Date of Patent: *Oct. 9, 2001

(54) BIOCHEMICAL OXIDATION SYSTEM AND PROCESS

(75) Inventors: John R. McWhirter, Boalsburg, PA (US); James L. Stanton, Fairport; Paul M. Kubera, Webster, both of NY (US)

(73) Assignee: General Signal Corporation, Muskegon, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,380

(22) Filed: Dec. 23, 1997

(51) Int. Cl.$^7$ .................................................. C02F 3/02
(52) U.S. Cl. .......................... 210/620; 210/627; 210/628; 210/806; 210/205; 210/219; 210/252; 423/DIG. 17; 435/262; 435/818; 435/822
(58) Field of Search ..................... 210/620, 806, 210/621, 622, 629, 631, 623, 624, 626, 627, 628, 205, 219, 252, 912, 918; 423/150.5, DIG. 17; 435/262, 822, 818

(56) References Cited

U.S. PATENT DOCUMENTS

| | | |
|---|---|---|
| Re. 29,781 | 9/1978 | McWhirter . |
| Re. 29,782 | 9/1978 | McWhirter . |
| 3,547,811 | 12/1970 | McWhirter . |
| 3,547,812 | 12/1970 | McWhirter . |
| 3,547,813 | 12/1970 | Robinson et al. . |
| 3,547,814 | 12/1970 | McWhirter . |
| 3,547,815 | 12/1970 | McWhirter . |
| 3,607,235 | * 9/1971 | Duncan . |
| 3,660,277 | 5/1972 | McWhirter et al. . |
| 3,670,887 | 6/1972 | McWhirter . |
| 3,775,307 | 11/1973 | McWhirter et al. . |
| 3,890,231 | 6/1975 | LaClair et al. . |
| 3,911,064 | 10/1975 | McWhirter et al. . |
| 3,963,609 | 6/1976 | La Clair et al. . |
| 4,193,854 | * 3/1980 | Drnevich et al. . |
| 4,540,528 | * 9/1985 | Haegeman . |
| 4,571,387 | * 2/1986 | Bruynesteyn et al. . |
| 4,578,163 | 3/1986 | Kunter et al. . |
| 4,987,081 | 1/1991 | Hackl et al. . |
| 5,006,320 | 4/1991 | Reid et al. . |
| 5,102,104 | 4/1992 | Reid et al. . |
| 5,143,543 | 9/1992 | Reid et al. . |
| 5,217,617 | * 6/1993 | Duncan et al. . |
| 5,288,302 | 2/1994 | Hallinan . |
| 5,332,559 | 7/1994 | Brierley et al. . |
| 5,536,297 | 7/1996 | Marchbank et al. . |

\* cited by examiner

Primary Examiner—Joseph W. Drodge
Assistant Examiner—Terry K. Cecil
(74) Attorney, Agent, or Firm—Pepper Hamilton LLP

(57) ABSTRACT

A biochemical oxidation system and process is disclosed for the removal of insoluble sulfides from metal ores. A liquid mixture of an ore slurry and of a liquid biochemical oxidation medium is flowed through a plurality of covered overflow tanks connected in series. The liquid mixture is continuously aerated in an aeration chamber formed in the tanks with a mixture of a purified oxygen gas and a purified carbon dioxide gas as introduced into the aeration chamber. A substantially sulfide-free liquid mixture is discharged from a last tank into a clarifier in which at least a portion of the biochemical oxidation medium is separated from the liquid mixture for recirculation into the tanks.

18 Claims, 2 Drawing Sheets

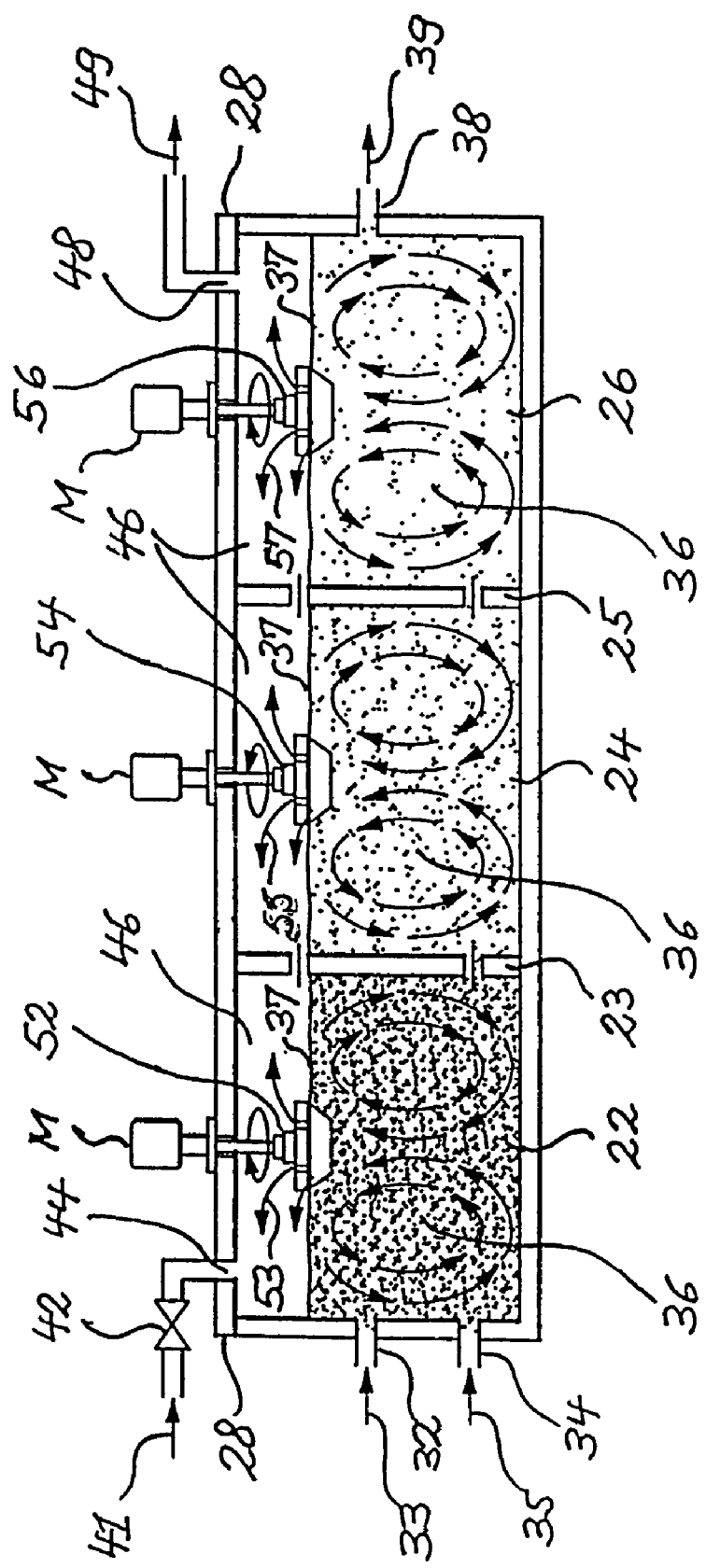

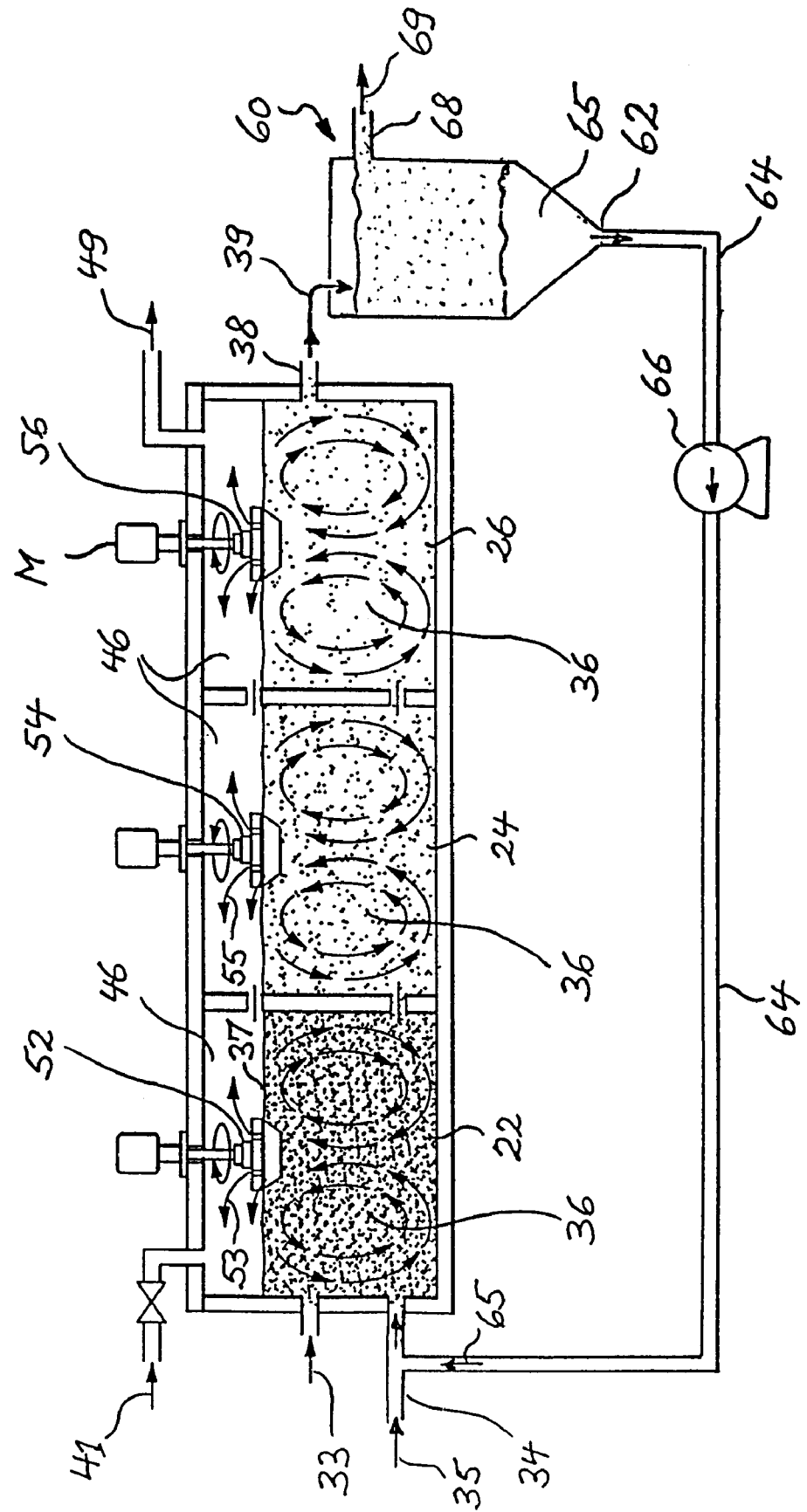

BIOCHEMICAL OXIDATION SYSTEM AND PROCESS

FILED OF THE INVENTION

The present invention relates generally to a system for processing a slurry of metal ores, and more particularly, to a biochemical oxidation system for removal of sulfides from metal ores. Metal ores are a species of mineral ores and reference to metal ores should be taken to include mineral ores generally.

BACKGROUND OF THE INVENTION

In recent years, numerous systems and processes have been developed in the metal refining industry for removal of insoluble sulfides from metal-containing ores. Particular advances have been made in the removal of sulfides by conversion to soluble sulfates through biochemical or biological oxidation, hereinafter referred to as a biochemical oxidation process or system. The soluble sulfates can then be readily separated from the remaining ore to allow for a subsequent efficient removal and recovery of the valuable ore metals such as gold, copper, or nickel. Sulfides occlude desired metal (e.g. Au) and prevent its recovery by conventional means (e.g., CN leach). Oxidation of sulfides "frees" metal so that the percentage of recovery can be increased.

In an industrial-scale biochemical oxidation system, a liquid slurry of an ore is prepared and fed into a suitably sized biochemical oxidation reaction vessel together with necessary biochemical oxidation nutrients, and a liquid suspension or dispersion of microorganisms such as, for example, bacterial microbes selected to provide effective oxidation of sulfides. The microorganisms must grow and develop to a satisfactory concentration level to achieve a desired high degree of removal of insoluble sulfides during a residence time of the liquids in the reaction vessel or reaction tank. The effectiveness of microorganisms to oxidize sulfides depends significantly upon the availability of dissolved oxygen in the liquid mixture in the tank. The dissolved oxygen requirements of a biochemical oxidation process are quite large due to the high stoichiometric requirement of oxygen to oxidize the insoluble metal sulfides to the corresponding soluble metal sulfates. An example of the high oxygen requirement is the biochemical oxidation of iron sulfides to ferric sulfate and sulfuric acid as follows:

$$4FeS_2 + 15O_2 \rightarrow 2Fe_2(SO_4)_3 + 2H_2SO_4 \quad \text{(Eq. 1)}$$

Thus, the rate at which the microorganisms in the ore slurry can be provided with a supply of dissolved oxygen determines the rate of oxidation of the sulfides to soluble sulfates. Stated differently, a reduced amount of dissolved oxygen available to the microorganisms will result in a reduced biochemical oxidation rate and, consequently, in an increased required residence time of the slurry in the biochemical oxidation system in order to effect sufficient conversion of the sulfides to the sulfates.

Numerous aeration systems and aeration methods have been devised to increase the supply of dissolved oxygen in order to manage the oxygen uptake rate in biochemical oxidation systems of a commercial scale. For example, U.S. Pat. No. 5,102,104 to Reid et al. discloses a biological conversion apparatus in which a biological conversion medium is thoroughly mixed with a biological conversion component such as, for example, air, in a plurality of mixing assemblies disposed in a cylindrical tank which has an open top end from which air is drawn into the mixing assemblies together with the biological conversion medium. The Reid et al. biochemical oxidation system proposes a total of about 60 hours of residence time of a slurry and a biological conversion medium in a tank or in tanks to achieve an approximate recovery of about 90% of a metal contained in the slurry. In U.S. Pat. No. 5,006,320 to Reid et al., there is disclosed a microbiological oxidation process for recovering mineral values. The process is a biological oxidation of sulfide in sulfide-containing ore. The process also uses aerating of the ore slurry during the biological oxidation step, in which oxygen and carbon dioxide are provided from air to a mixing assembly substantially identical to the system described in the above referenced patent to Reid et al. U.S. Pat. No. 4,987,081 to Hackl et al. discloses a chemical/biological process to oxidize multimetallic sulfide ores. The Hackl et al. process proposes to achieve as much as a 98% sulfide oxidation when the finely ground ore is leeched in agitated air-sparged tanks, with three different types of bacteria contained in different processing stages or tanks.

In the above cited references air is used to provide the oxygen to the microbial oxidation process carried out in a biochemical oxidation system. In view of the high stoichiometric requirement for oxygen in a fully effective biochemical oxidation process, the major cost of operating a biochemical oxidation system for converting insoluble sulfides to soluble sulfates is the cost associated with supplying adequate dissolved oxygen to the liquid mixture containing the microorganisms. Additionally, the ability to economically supply an adequate level of dissolved oxygen to the microorganisms frequently limits the rate of oxidation and, therefore, increases the residence time of the liquid mixture in a tank or tanks required to substantially convert the insoluble sulfides into soluble sulfates. Thus, even an effective aeration system for aerating an ore slurry containing a biochemical oxidation medium may be limited in its effectiveness by the rate at which dissolved oxygen can be provided to the system from an air supply.

Accordingly, it is desirable to provide a biochemical oxidation system for removal of insoluble sulfides from metal ores to which an enhanced rate of dissolved oxygen can be economically provided and effectively introduced into a biochemical oxidation reactor containing a liquid mixture comprises of a liquid slurry of a metal ore and of a liquid biochemical oxidation medium.

SUMMARY OF THE INVENTION

It is an object of the present invention to provide a liquid-based biochemical oxidation system for removal of insoluble sulfides from metal ores in which purified oxygen gas is efficiently and economically used as one aeration gas medium to provide an measured rate of dissolved oxygen into a liquid mixture comprises a liquid slurry of a metal ore and of a liquid biochemical oxidation medium.

It is another object of the present invention to provide a liquid-based biochemical oxidation system in which a mixture of purified oxygen gas and of purified carbon dioxide gas is provided to a liquid mixture which is flowed through a plurality of covered tanks connected in series.

It is a further object of the present invention to provide a liquid-based biochemical oxidation system comprises a plurality of covered tanks connected in series, in which at least a portion of a biochemical oxidation medium contained in a liquid mixture discharged from a last tank is separated from the liquid mixture and is recirculated into the tanks through a first tank.

These and other objects of the present invention are achieved in a biochemical oxidation system and process for the removal of insoluble sulfides from metal ores, in which a liquid mixture of an ore slurry and of a liquid biochemical oxidation medium is flowed through a plurality of covered overflow tanks connected in series. The liquid mixture is continuously aerated by surface aerators disposed in an aeration chamber formed in the tanks. The aerating gas introduced into the aeration chamber is a mixture of a purified oxygen gas and of a purified carbon dioxide gas. The oxygen content of the aeration gas may range from that of air (21% $O_2$) to substantially pure (99+%) $O_2$, and gas feed is either "pure" $O_2$ or $O_2$ plus air. However, depending on the mineralogy and the overall process requirements, the process result can range from "sulfide free" to less than 100% sulfide oxidation. The percentage of sulfide oxidation required is a function of the mineral process used and its dependence on the percentage of sulfide oxidation required and may depend upon further or alternative downstream processing. A substantially sulfide-free liquid mixture may be discharged from a last tank into a clarifier in which at least a portion of the biochemical oxidation medium is separated from the liquid mixture for recirculation into the biochemical oxidation tanks.

BRIEF DESCRIPTION OF THE DRAWINGS

FIG. 1 is a schematic side view of a biochemical oxidation system for the removal of insoluble sulfides from metal ores in accordance with one aspect of the present invention in which a liquid mixture of an ore slurry and a biochemical oxidation medium is flowed through a plurality of covered tanks connected in series, the liquid mixture being aerated by surface aerators in an aeration chamber formed in the tanks; and FIG. 2 is a schematic side view of the biochemical oxidation system shown in FIG. 1 in which a substantially sulfide-free liquid mixture is discharged into a clarifier for recovery and recirculation into the tanks of at least a portion of the biochemical oxidation medium in accordance with another aspect of the present invention.

DESCRIPTION OF THE PREFERRED EMBODIMENT

FIG. 1 depicts a schematic side view of a biochemical oxidation system for the removal of insoluble sulfides from metal ores. The biochemical oxidation system, generally designated with the numeral 10, has a plurality of hydraulically coupled tanks 22, 24 and 26, with a first tank 22 separated from a second tank 24 by an overflow baffle 23, and the second tank 24 separated from a last tank 26 by an overflow baffle 25. The tanks are covered by a cover 28 which is depicted here as supporting a surface aerator 52 centrally disposed over the tank 22, a surface aerator 54 centrally disposed over the tank 24, and a surface aerator 56 centrally disposed over the tank 26, with a drive motor M associated with each of the aerators mounted on an outer surface of the cover 28.

A liquid mixture, generally designated at 36, has a common upper level 37 in the tanks, the common upper level being defined by the overflow baffles 23 and 25. The liquid mixture 36 comprises a liquid slurry 33 which is continually fed into the first tank 22 through a slurry feed port 32, and of a liquid biochemical oxidation medium 35 continuously fed into the first tank 22 through a biochemical oxidation medium feed port 34. Both the liquid slurry 33 of the metal containing ore and the biochemical oxidation medium 35 are prepared in and provided by upstream processing systems well known in the art, and which are not shown here for purposes of clarity of presentation. The liquid slurry 33 may contain suitable nutrients, and the liquid biochemical oxidation medium comprises a suspension or a dispersion of suitably selected microorganisms, such as, for example, suitably selected bacteria, and the liquid slurry 33 and the liquid biochemical oxidation medium 35 are fed into the first tank 22 at appropriately controlled flow rates to ensure that the liquid mixture 36 in the tanks achieves and maintains a desirable concentration of the biochemical oxidation medium in the slurry.

For illustrative purposes only, a relatively high concentration of insoluble sulfides contained in the liquid slurry 33 is indicated in the first tank 22 by a relatively concentrated dotted overlay on the liquid mixture 36 in this tank. As the liquid mixture 36 flows from the first tank 22 through the second tank 24 to the last tank 26, the concentration of insoluble sulfides progressively decreases, as indicated by progressively lower density of the dotted overlay in these tanks. A steady and continuous flow of the liquid mixture 36 from the first tank 22 through the last tank 26 is established by the feed rates of the liquid slurry 33 and the liquid biochemical oxidation medium 35 and by appropriately sized openings (not particularly designated in FIG. 1) in the overflow baffles 23 and 25, and by an appropriately dimensioned discharge port 38 disposed on the last tank 26 through which a substantially sulfide-free liquid mixture discharge 39 exits the system for further processing (not shown).

An aeration chamber 46 is formed which extends in a vertical direction between the common upper level 37 of the liquid mixture 36 and the cover 28, and which extends laterally from the first tank 22 to the last tank 26. A purified gas mixture 41 comprised of purified oxygen gas and from 1–5 volume percent of purified carbon dioxide gas is introduced into the aeration chamber 46 at the first tank 22 through a pressure sensor and control valve assembly 42 and a gas inlet port 44. The purified gas mixture 41 flows continuously in the aeration chamber 46 at an appropriately selected gas flow rate from the first tank 22 through the last tank 26. Residual amounts of the purified gas mixture 41 as well as other gaseous products produced in the biochemical oxidation system 10 are exhausted from the system as exhaust gas 49 through an exhaust gas discharge port 48 disposed in the last tank 26.

While the gas inlet port 44 and the exhaust gas discharge port 48 are shown as being disposed in the cover 28, it will be readily apparent that these gas ports can be located to enter and exit the aeration chamber 46 on the side walls (not particularly identified) of the first and last tanks 22 and 26 above the respective slurry feed port 32 and the discharge port 38. In any event, it will be appreciated that the flow of the purified gas mixture 41 and the flow of the liquid mixture 36 are concurrent flows in that both the gas flow and the liquid mixture flow proceed in a direction from the first tank 22 through the last tank 26 of the plurality of tanks.

Each of the identical surface aerators 52, 54, and 56 extend through the aeration chamber 46 into the common upper level 37 of the liquid mixture 36 in each corresponding tank. Driven by drive motors M, the surface aerators draw a portion of the liquid mixture 36 from each tank and produce droplet streams 53, 55, and 57, respectively, of the liquid mixture 36. These droplet streams are projected in each of the tanks 22, 24, and 26 through the aeration chamber 46 so as to entrain and adsorb on the droplet surfaces the purified oxygen gas and the purified carbon dioxide gas provided to the aeration chamber by the purified gas mixture 41. The stream of droplets having absorbed the gases into the droplets reenter the common upper surface of the liquid mixture 36, thereby providing the liquid biochemical oxidation medium 35 in the liquid mixture 36 with dissolved oxygen and with dissolved carbon dioxide. A suitable surface aerator impeller may be of a pitch blade turbine or radial flow type models A200 and R335 commercially available from LIGHTNIN (a unit of General Signal Corporation), Rochester, N.Y., U.S.A. This aeration system, used in conjunction with the purified gas mixture of purified oxygen gas and from 1–5 volume percent purified carbon dioxide gas significantly increases the mass transfer capability of the aeration system (gases) per unit volume of the ore slurry being treated, as well as reducing the overall cost of supplying dissolved oxygen and dissolved carbon dioxide to the biochemical oxidation medium in the tanks. Stated differently, the system of the present invention can provide a substantially stoichiometric amount of dissolved oxygen to the liquid mixture (the amount which provides substantially complete sulfide oxidation (sulfide to sulfate conversion) while also providing increased dissolved carbon dioxide for bacterial growth and respiration), and thus achieve an increased rate of sulfide removal from the liquid mixture 36 at reduced operating costs compared to the operating costs associated with a prior art system which uses air alone as the gas supply.

In addition to using aeration with purified oxygen gas, the gas mixture 41 contains from 1–5 volume percent of purified carbon dioxide gas. Carbon dioxide is the source of carbon which facilitates or enhances growth of the microorganisms in the biochemical oxidation medium through formation of new cell mass another nutrient and supply of additional oxygen in accordance with the following chemical reaction:

$$6CO_2 + 6H_2O \rightarrow C_6H_{12}O_6 + 6O_2 \quad \text{(Eg.2)}$$

The transfer of carbon dioxide to the liquid phase controls the rate of growth of the microorganisms in the system, with an increased carbon dioxide transfer resulting in an increased growth rate of the bacterial microorganisms and, therefore, will result in an increased rate of sulfide oxidation and removal. By way of example, a carbon dioxide concentration of only 3 volume percent in the purified oxygen feed gas provides about a 100-fold increase in the transfer rate of carbon dioxide to the biochemical oxidation medium of the liquid mixture 36, as compared to conventional air aeration which provides a carbon dioxide concentration of only about 0.03 volume percent. Thus, providing effective aeration of the liquid mixture 36 by the surface aerators 52, 54, and 56 with the purified gas mixture 41 in the aeration chamber 46 enhances the growth rate of the microorganisms in the biochemical oxidation medium and enhances the overall oxidation rate of the insoluble sulfides to soluble sulfates in the system, so that the processing time and/or the size of the reaction tanks can be reduced to accomplish a desired level of sulfide removal.

Referring now to FIG. 2, there is shown the biochemical oxidation system 10 of FIG. 1 in which like numerals denote like parts or like functions. The distinguishing feature is a clarifier, designated with the numeral 60, which received the liquid mixture discharge 39 from the discharge port 38 of the biochemical oxidation system 10. The clarifier 60 may be of the gravity sedimentation type but may also employ a different type of device for solid-liquid separation, such as a filtration type or a centrifuge type clarifier, preferably in which at least a portion 65 of the liquid biochemical oxidation medium 35 is separated from the liquid mixture. The term "clarifier" includes any of such different types. A clarified discharge 69 is directed to other processing facilities (not shown) through a clarifier discharge port 68. The separated portion 65 of the biochemical oxidation medium is drawn from the clarifier through a biochemical oxidation return port 62 by a pump 66 for recirculation through a conduit 64 to the biochemical oxidation medium feed port 34 of the first tank 22. Recirculation of at least a portion of the biochemical oxidation medium further enhances the concentration of the biochemical oxidation medium in the liquid mixture 36 within the tanks and therefore further enhances the rate of biochemical oxidation in the biochemical oxidation system 10.

It will be appreciated that recycling of the biochemical oxidation medium is not desirable or advantageous in a biochemical oxidation system which is aerated by air because the increased oxygen transfer rate requirement commensurate with an increased concentration of the biochemical oxidation medium in the tanks can not be achieved with air aeration. The same limitation exists for air aeration systems with respect to the addition of carbon dioxide to the feed air. Furthermore, the carbon dioxide utilization efficiency of an air aeration system is very low, and therefore the cost associated with carbon dioxide addition is relatively high. These limitations of air aeration systems are overcome by the biochemical oxidation system of the present invention which uses a mixture of purified oxygen gas and purified carbon dioxide gas to aerate the liquid mixture and in which a high utilization efficiency of both the high purity oxygen gas and the carbon dioxide gas led to the system are achieved.

Although the present invention has been described with respect to specific preferred embodiments, various changes and modifications may be suggested to one skilled in the art. For example, the number of tanks of the biochemical oxidation system 10 can be selected to achieve maximum sulfide removal from an ore slurry depending on the sulfide concentration of a particular ore. Also, types of gas-liquid contacting equipment other than surface aerators may be used in the individual tanks in the system and still achieve the substantial benefits of the present invention. The foregoing description should therefore be taken as illustrative and not in a limiting sense.

What is claimed is:
1. A biochemical oxidation system for removal of insoluble sulfides from metal ores, comprising:
   a plurality of coupled tanks through which a liquid mixture comprising a liquid slurry of a metal ore and of a liquid biochemical oxidation medium is flowed under continuous aeration to provide from a tank discharge port a liquid mixture sufficiently free of sulfides to enhance recovery of said ores,
   said plurality of coupled tanks being serially connected and hydraulically coupled defining a common upper level of said liquid mixture in each of said tanks;
   a cover disposed over said tanks spacedly above said common upper level of said mixture;
   an aeration chamber formed between said cover and said common upper level of the liquid mixture, said chamber extending from the first tank to the last tank;
   a source of a purified gas that is essentially a mixture of purified oxygen and purified carbon dioxide gases;
   a means for introducing said purified gas mixture into said aeration chamber in superatmospheric percentages of each of said oxygen and carbon dioxide gases for aeration of said liquid mixture;
   a surface aerator which extends through said aeration chamber into said common upper level of said liquid mixture at a central position over each one of the plurality of tanks to aerate the liquid mixture therein by projecting streams of droplets of said liquid mixture upwards from said surface into said aeration chamber so as to entrain and absorb on said droplet surfaces said gases; and means for discharging exhaust gases from said aeration chamber.

2. The biochemical oxidation system of claim 1, wherein the means for introducing the purified gas mixture includes a pressure sensor and a control valve coupled between a gas inlet port of the first tank and a gas supply system for supplying the purified gases.

3. The biochemical oxidation system of claim 2 wherein said purified gas mixture contains between 1 volume percent and 5 volume percent of purified carbon dioxide gas in said gas mixture.

4. The biochemical oxidation system of claim 1 wherein the liquid biochemical oxidation medium comprises biological microorganisms which are dispersed in a liquid.

5. The biochemical oxidation system of claim 1 wherein the liquid slurry of an ore is provided at a slurry feed port disposed at the first tank, the liquid biochemical oxidation medium is provided at a biochemical oxidation medium feed port disposed at the first tank, the liquid slurry and the liquid biochemical oxidation medium are provided at the respective feed ports to fill the plurality of coupled tanks to the common upper level of the liquid mixture, and to maintain the common upper level of the liquid mixture in the tanks while the liquid mixture is flowed through the plurality of tanks.

6. A biochemical oxidation system for removal of insoluble sulfides from metal ores, comprising:

a plurality of overflow tanks connected in series, said tanks being adapted for flow of a liquid mixture therethrough at a defined common upper level of said liquid mixture;

a cover disposed over said tanks spacedly above said common upper level of said liquid mixture;

an aeration chamber formed between said cover and said common upper level of said liquid mixture in said tanks, said chamber extending from a first tank to a last tank of said plurality of tanks;

a source of a purified gas that is essentially a mixture of purified oxygen and purified carbon dioxide gases;

means for introducing into said aeration chamber at a gas inlet port said purified gas mixture in superatmospheric percentages of each of said oxygen and carbon dioxide gases for aeration of said liquid mixture;

a surface aerator extending through said aeration chamber into the upper level of said liquid mixture at a central position over each one of said tanks to continuously aerate the liquid mixture therein by projecting streams of droplets of said liquid mixture upwards from said surface into said aeration chamber so as to entrain and absorb on said droplet surfaces said oxygen gas and said carbon dioxide gas;

a slurry feed port on said first tank for feeding a liquid slurry of a metal ore containing metal sulfides into said tanks, and for maintaining a flow of such slurry through said tanks;

a biochemical oxidation medium feed port for feeding into said tanks a liquid biochemical oxidation medium adapted to remove the insoluble metal sulfides from the slurry, and for maintaining a flow of such biochemical oxidation medium through said tanks;

a liquid mixture comprising the liquid slurry and the liquid biochemical oxidation medium;

a discharge port for discharging a substantially sulfide-free liquid mixture;

a clarifier coupled to said discharge port for receiving the substantially metal sulfide-free liquid mixture, said clarifier being adapted to separate at least a portion of the liquid biochemical oxidation medium from the liquid mixture, the separated portion being provided at a clarifier biochemical oxidation return port;

means for recirculating said separated portion of the biochemical oxidation medium from the clarifier biochemical oxidation return port to said biochemical oxidation medium feed port; and means for discharging exhaust gases from said aeration chamber at a gas discharging port.

7. The biochemical oxidation system of claim 6 wherein the liquid biochemical oxidation medium comprises biological microorganisms disposed in a liquid.

8. A biochemical oxidation process for removing insoluble sulfides from a metal ore, comprising the steps of:

providing a plurality of overflow tanks hydraulically connected in series for flowing a liquid mixture therethrough at a common upper level of the liquid mixture;

disposing a cover over said tanks spacedly above said common upper level of said liquid mixture to form an aeration chamber therebetween;

introducing into said tanks a liquid mixture comprising a slurry of a metal ore containing metal sulfides and of a liquid biochemical oxidation medium;

introducing into said aeration chamber a mixture of purified gases comprising essentially a purified oxygen gas and a purified carbon dioxide gas, each gas being enriched to greater than atmospheric percentages in said mixture of gases;

projecting a plurality of droplet streams of said liquid mixture upwards from said common upper level into said aeration chamber to aerate said droplets of liquid mixture in each tank with said mixture of gases;

discharging a substantially sulfide-free liquid mixture into a clarifier;

separating at least a portion of said liquid biochemical oxidation medium from said liquid mixture in said clarifier; and recirculating the portion of said liquid biochemical oxidation medium to at least one of said tanks.

9. The process of claim 8 wherein the filling step includes the steps of:

feeding the liquid slurry of the metal ore into the first tank through a slurry feed port; and maintaining a flow of the liquid slurry through the tanks.

10. The process of claim 8 wherein the filling step further includes the steps of:

feeding the liquid biochemical oxidation medium into the first tank through a biochemical oxidation medium feed port;

feeding the recirculating liquid biochemical oxidation medium to the first tank; and maintaining a flow of the liquid biochemical oxidation medium and of the recirculating liquid biochemical oxidation medium through the tanks.

11. The process of claim 8 wherein the introducing step includes the step of:

introducing at a gas inlet port of the first tank said mixture of purified oxygen gas and of from 1 to 5 volume percent purified carbon dioxide gas.

12. The process of claim 8 wherein the aerating step includes the steps of:

positioning a surface aerator centrally over each one of the plurality of tanks so as to extend through the aeration chamber formed between the cover and the common upper level of the liquid mixture, and extending into the common upper level of the liquid mixture; and surface aerating the liquid mixture.

13. The process of claim 8 wherein the aeration chamber forming step includes the step of:

discharging exhaust gases from the aeration chamber at the last tank of the plurality of tanks.

14. A biochemical oxidation process for removing insoluble sulfides from a metal ore, comprising the steps of:

a) providing a plurality of overflow tanks hydraulically connected in series for flowing a liquid mixture therethrough at a common upper level of the liquid mixture;

b) disposing a cover over said tank spacedly above said common upper level of the liquid mixture to form an aeration chamber therebetween;

c) introducing into said tank said liquid mixture comprising a slurry of a metal ore containing metal sulfides and of a liquid biochemical oxidation medium;

d) introducing into said aeration chamber a purified aeration gas including essentially a mixture of a purified oxygen gas and a purified carbon dioxide, each gas at superatmospheric percentages in said aeration gas; and e) projecting a plurality of droplet streams of said liquid mixture upwards from said upper surface into said aeration chamber to aerate said droplets of liquid mixture in each tank with said aeration gas.

15. A biochemical oxidation system for removal of insoluble sulfides from metal ores, comprising:

a plurality of coupled tanks through which a liquid mixture comprising a liquid slurry of a metal ore and of a liquid biochemical oxidation medium is flowed under continuous aeration to provide from a tank discharge port a liquid mixture sufficiently free of sulfides to enhance recovery of said ores, said plurality of coupled tanks being serially connected and hydraulic coupled defining a common upper level of said liquid mixture in each of said tanks;

a cover disposed over said tanks spacedly above said common upper level of said mixture;

a plurality of aeration chambers formed respectively for each of said plurality of coupled tanks, said aeration chambers with said tanks being serially connected from a first one of said aeration chambers to a last one of said aeration chambers, said aeration chambers being formed between said cover and said common upper level of the liquid mixture;

a source of a purified gas that is essentially a mixture of purified oxygen and purified carbon dioxide gases;

means for introducing said purified gas mixture into said first one of said aeration chambers in superatmospheric percentages of each of said oxygen and carbon dioxide gases for aeration of said liquid mixture;

a plurality of surface aerators which extend respectively through each of said aeration chambers into said common upper level of said liquid mixture at a central position over each one of the tanks to aerate the liquid mixture therein by projecting streams of droplets of said liquid mixture upwards from said surface into each of said aeration chambers so as to entrain and absorb on said droplet surfaces said gases; and means for discharging exhaust gases from said last one of said aeration chambers.

16. A biochemical oxidation system for removal of insoluble sulfides from metal ores, comprising:

a plurality of overflow tanks connected in series, from a first tank to a last tank, said tanks being adapted for a flow of a liquid mixture therethrough at a defined common upper level of said liquid mixture;

a cover disposed over said tanks spacedly above said common upper level of said mixture;

a plurality of aeration chambers formed respectively for each of said plurality of coupled tanks, said aeration chambers with said tanks being serially connected from a first one of said aeration chambers to a last one of said aeration chambers, said aeration chambers being formed between said cover and said common upper level of the liquid mixture;

a source of a purified gas that is essentially a mixture of purified oxygen and purified carbon dioxide gases;

means for introducing into said first one of said aeration chambers at a gas inlet port, said purified gas mixture in superatmospheric percentages of each of said oxygen and carbon dioxide gases for aeration of said liquid mixture;

a plurality of surface aerators extending respectively through each of said aeration chambers into the upper level of said liquid mixture at a central position over each one of said tanks to continuously aerate the liquid mixture therein by projecting streams of droplets of said liquid mixture upwards from said surface into each of said aeration chambers so as to entrain and absorb on said droplet surfaces said oxygen gas and said carbon dioxide gas;

a slurry feed port on said first tank for feeding a liquid slurry of a metal ore containing metal sulfides into said tanks, and for maintaining a flow of such slurry through said tanks;

a biochemical oxidation medium feed port for feeding into said tanks a liquid biochemical oxidation medium adapted to remove the insoluble metal sulfides from the slurry, and for maintaining a flow of such biochemical oxidation medium through said tanks;

a liquid mixture comprising the liquid slurry and the liquid biochemical oxidation medium;

discharge port for discharging a substantially sulfide-free liquid mixture;

a clarifier coupled to said discharge port for receiving the substantially metal sulfide-free liquid mixture, said clarifier being adapted to separate at least a portion of the liquid biochemical oxidation medium from the liquid mixture, the separated portion being provided at a clarifier biochemical oxidation return port;

means for recirculating said separated portion of the biochemical oxidation medium from the clarifier biochemical oxidation return port to said biochemical oxidation medium feed port; and means for discharging exhaust gases from said last one of said aeration chambers at a gas discharging port.

17. A biochemical oxidation process for removing insoluble sulfides from a metal ore, comprising the steps of:

providing a plurality of overflow tanks hydraulically connected in series from a first tank to a last tank, for flowing a liquid mixture therethrough at a common upper level of the liquid mixture;

disposing a cover over said tanks spacedly above said common upper level of said liquid mixture to form a plurality of aeration chambers respectively between said liquid mixture and each of said tanks, said aeration chambers with said tanks being serially connected from a first one of said aeration chambers to a last one of said aeration chambers;

introducing into said tanks a liquid mixture comprising a slurry of a metal ore containing metal sulfides and of a liquid biochemical oxidation medium;

introducing into said first one of said aeration chambers a mixture of purified gases comprising essentially a purified oxygen gas and a purified carbon dioxide gas, each gas being enriched to greater than atmospheric percentages in said mixture of gases;

projecting a plurality of droplet streams of said liquid mixture upwards from said common upper level into each of said aeration chambers to aerate said droplets of liquid mixture in each of said tanks with said mixture of gases;

discharging a substantially sulfide-free liquid mixture into a clarifier;

separating at least a portion of said liquid biochemical oxidation medium from said liquid mixture in said clarifier; and recirculating the portion of said liquid biochemical oxidation medium to at least one said tanks.

18. A biochemical oxidation process for removing insoluble sulfides from a metal ore, comprising the steps of:

a) providing a plurality of overflow tanks hydraulically connected in series for flowing a liquid mixture therethrough at a common upper level of said liquid mixture;

b) disposing a cover over said tanks spacedly above said upper surface of said liquid mixture to form a plurality of aeration chambers respectively between said liquid mixture and each of said tanks, said aeration chambers with said tanks being serially connected from a first one of said aeration chambers to a last one of said aeration chambers;

c) introducing into said tank said liquid mixture comprising a slurry of a metal ore containing said metal sulfides and of a liquid biochemical oxidation medium;

d) introducing into said first one of said aeration chambers a purified aeration gas including essentially a mixture of a purified oxygen gas and a purified carbon dioxide gas, each gas at superatmospheric percentages in said aeration gas; and e) projecting a plurality of droplet streams of said liquid mixture upwards from said upper surface into each of said aeration chambers, to aerate said droplets of liquid mixture in each of said tanks with said aeration gas.

* * * * *

UNITED STATES PATENT AND TRADEMARK OFFICE
CERTIFICATE OF CORRECTION

PATENT NO.       : 6,299,776 B1                                               Page 1 of 1
APPLICATION NO.  : 08/996380
DATED            : October 9, 2001
INVENTOR(S)      : John R. McWhirter, James L. Stanton and Paul M. Kubera It is certified that error appears in the above-identified patent and that said Letters Patent is hereby corrected as shown below:

On Title Page, Item (73)
After "Assignee: General Signal Corporation, Muskegon, MI (US)" insert the following:

-- The Pennsylvania State University, University Park, PA (US) --

Signed and Sealed this

Twentieth Day of March, 2007

JON W. DUDAS
*Director of the United States Patent and Trademark Office*